United States Patent
Langberg et al.

(10) Patent No.: US 7,564,678 B2
(45) Date of Patent: Jul. 21, 2009

(54) ADAPTING DEVICE FOR A PORTABLE DEVICE

(75) Inventors: Eric Aaron Langberg, Milford, PA (US); Toshihide Hokari, Oak Ridge, NJ (US)

(73) Assignee: Plantronics, Inc., Santa Cruz, CA (US)

( * ) Notice: Subject to any disclaimer, the term of this patent is extended or adjusted under 35 U.S.C. 154(b) by 464 days.

(21) Appl. No.: 11/143,948

(22) Filed: Nov. 29, 2005

(65) Prior Publication Data

US 2006/0116009 A1     Jun. 1, 2006

Related U.S. Application Data

(60) Provisional application No. 60/651,616, filed on Feb. 11, 2005.

(51) Int. Cl.
G06F 1/20 (2006.01)
H05K 7/20 (2006.01)
(52) U.S. Cl. .................................. 361/679; 361/686
(58) Field of Classification Search ................. 361/679, 361/686, 684, 602
See application file for complete search history.

(56) References Cited

U.S. PATENT DOCUMENTS

| | | | |
|---|---|---|---|
| 7,088,575 B2 * | 8/2006 | Chiu et al. | 361/679 |
| 2006/0125445 A1 * | 6/2006 | Cao et al. | 320/112 |
| 2007/0261978 A1 * | 11/2007 | Sanderson | 206/320 |
| 2008/0123285 A1 * | 5/2008 | Fadell et al. | 361/686 |
| 2008/0123287 A1 * | 5/2008 | Rossell et al. | 361/686 |

* cited by examiner

Primary Examiner—Hae Moon Hyeon
(74) Attorney, Agent, or Firm—Richard Kurtz (57) ABSTRACT

An adapting device for adapting a first portable media player to emulate selected mechanical and electrical characteristics of a second portable media player includes a housing having first and second connectors. A signal converter is operatively connected to the first connector and the second connector for converting a first signal representing at least one command received over the second connector into a second signal representing the command to be transmitted over the first connector. A mechanical interface is configured to interconnect the second connector with an accessory device that accommodates a second portable media player having the second connector.

37 Claims, 6 Drawing Sheets

ADAPTING DEVICE FOR A PORTABLE DEVICE

REFERENCE TO RELATED APPLICATION

This non-provisional application claims priority to U.S. Provisional Patent Application No. 60/651,616 filed Feb. 11, 2005, entitled "System for Adapting Devices," the entire disclosure of which is incorporated herein by reference.

BACKGROUND OF THE INVENTION

Many portable or mobile devices are capable of communicating with a computer over proprietary multi-pin connectors. One example of such devices is the iPod.R™, sold by Apple Computer Corporation of Cupertino Calif., which uses a proprietary 30-pin connector for power, data, and audio connections. Other portable or mobile devices utilize industry standard connectors (e.g., Universal Serial Bus "USB" or D-subminiature connector DB-9) and signals. In some cases, these devices will employ modifications of industry standard connectors with either extra connection points added or with non-standard wiring. Such modifications preclude direct connection to such devices of other devices which are designed with industry standard interfaces.

Adapting cables and adapters which correct wiring pinouts or adapt from one connector to another are known in the industry and by consumers. Examples of such are null-modem cables, DB-9 to PS-2 adapters for computer mice, and RCA-type stereo connectors to 3.5 mm stereo plugs. Docking stations are known in the industry as a means for adapting electrical connections on a device from one style to another. For example, docking stations for a personal digital assistant ("PDA") typically adapt a multi-pin connector to a USB connector. These devices, however, generally adapt only the wiring and connection method, not the physical size and mechanical outline of the portable device itself. Mechanical adapters have been used in the past to enable use of smaller mechanical items in systems requiring bigger ones. One example of such adapters is the VHS-C-to-VHS adapter that allows the use of a VHS-C cassette in a standard VHS video cassette recorder.

Figure 4A:
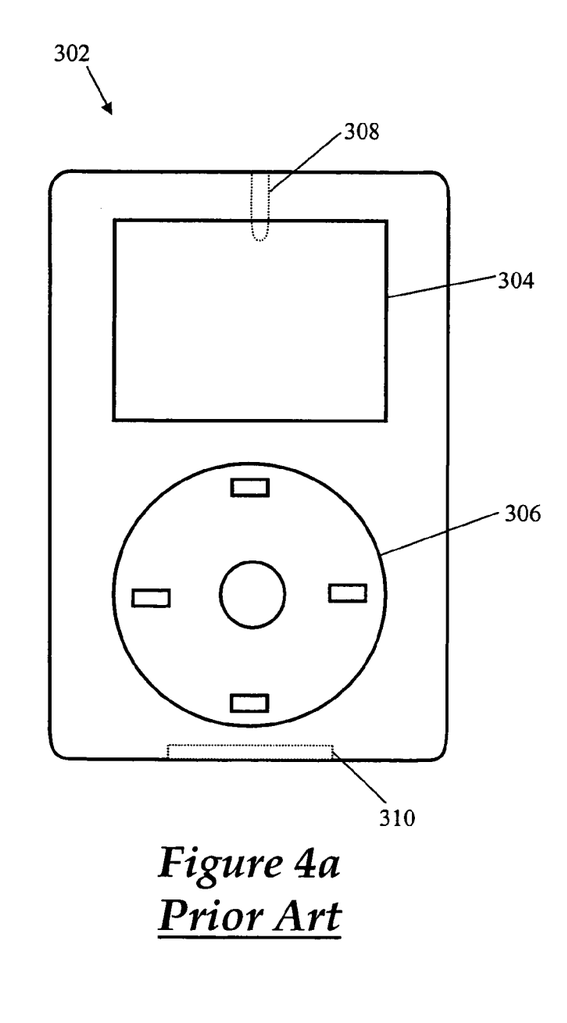
FIG. 4*a* shows a front view of a system existing in the prior art.
Figure 4B:
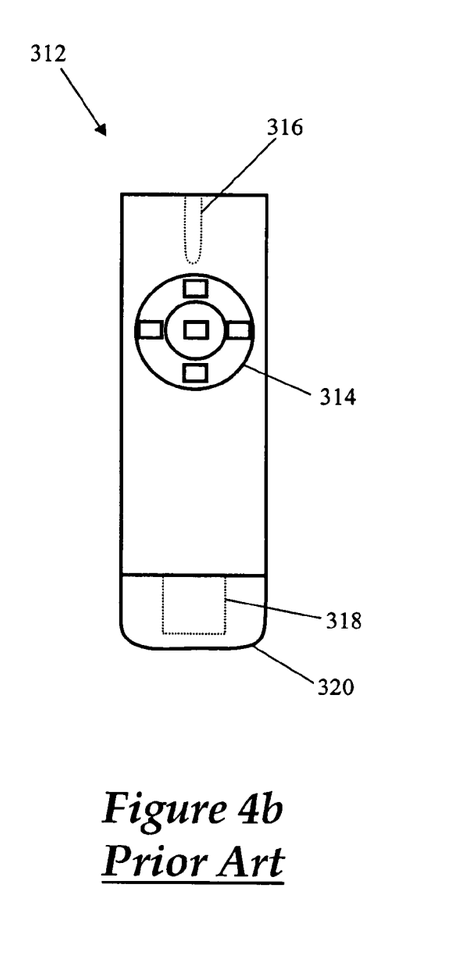
FIG. 4*b* shows a front view of a system existing in the prior art.

Referring to FIG. 4a, a portable media player 302 (prior art), such as the Apple iPod®, comprises an output screen 304, an input control panel 306, a 3.5 mm (or ⅛") stereo output female jack 308, and a 30-pin connector 310. The system includes memory and a processor, which are configured to store, play, and perform other operations on digital music media. Information regarding the media, the music being played, and so forth may be output via the output screen 304. The player may be controlled via the input control panel 306, which may include buttons corresponding to play, stop, pause, skip, replay, and so forth. An audio signal is output via the female jack 308, and information, audio, and power are input into and/or output from the system 302 via the 30-pin connector 310. Referring to FIG. 4b, a portable media player 312 existing in the prior art, such as the Apple iPod® Shuffle, comprises an input control panel 314, a 3.5 mm (⅛") stereo output female jack 316, a USB plug 318 and a removable cap 320 that covers the USB plug 318. The system includes memory and a processor, which are configured to store, play, and perform other operations on digital music media. The player may be controlled via the input control panel 314, which may include buttons corresponding to play, stop, pause, skip, replay, and so forth. An audio signal is output via the female jack 316, and information, audio and power are input into and/or output from the system 302 via the USB plug 318.

SUMMARY OF THE INVENTION

The present invention in the illustrated embodiments solves incompatibilities and other limitations associated with the prior art by providing a system that adapts both the physical size, mechanical and electrical properties of connectors, and/or aspects associated with one portable device to those of another. In one embodiment, the invention provides an adapting device for adapting a first portable media player to emulate a second portable media player, the adapter having an electrical connector and a housing. The electrical connector is configured to adapt the electrical connections of the first portable media player to emulate electrical connections of the second portable media player. The housing is configured to adapt at least a portion of the form factor of the housing of the first portable media player to emulate at least a portion of the form factor of the housing of the second portable media player. The first portable media player is thus adapted by the adapting device to be compatible with accessories designed to interface with the second portable media player.

In accordance with another embodiment, the invention provides an adapting device for adapting a first portable media player to emulate selected mechanical and electrical characteristics of a second portable media player. The adapting device includes a housing having first and second connectors and a signal converter operatively connected to the first and second connectors for converting a signal representing at least one command, the signal being received over the second connector, into a second signal representing the command to be transmitted over the first connector. A mechanical interface is provided to interconnect the second connector with an accessory device that accommodates a second portable media player having the second connector.

In a further embodiment, the invention provides an adapting device for adapting an iPod Shuffle to emulate selected mechanical and electrical characteristics of an iPod having an iPod multi-pin connector, e.g. an iPod 30-pin connector. In this embodiment, the adapting device includes a housing having a USB compatible connector and a multi-pin connector. A signal converter operatively connected to the USB compatible connector and the multi-pin connector converts a first signal representing at least one command, the first signal being received over the multi-pin iPod connector, into a second signal representing the command to be transmitted over the USB compatible connector. A mechanical interface is configured to interconnect the multi-pin iPod connector with an accessory device that accommodates an iPod having the multi-pin connector.

BRIEF DESCRIPTION OF THE DRAWINGS

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof. The same reference numeral may be used to identify like elements throughout the figures. In the figures.

DETAILED DESCRIPTION OF THE PREFERRED EMBODIMENT

Reference will now be made in detail to the preferred embodiments of the present invention, examples of which are illustrated in the accompanying drawings.

The invention in one embodiment provides a mechanical carrier which receives a miniature portable media player such as the iPod® Shuffle and performs signal routing and voltage conversion to allow the player to dock into any device designed to interface with iPod portable media players having larger form factors and connectors. For example, the invention allows the iPod Shuffle to be used with an Altec Lansing in Motion™ portable speaker system, which is designed for standard sized portable media players such as the Apple iPod® that employ the Apple multi-pin connector, which is presently a 30-pin connector. The invention in this embodiment thereby may provide for transfer of analog audio signals, charging of the miniature portable media player, transfer of commands for the miniature portable media player and the transfer of analog audio signals and other data. The mechanical carrier may be configured so that the exterior dimensions mimic those of one of the plurality of iPod® portable media players (i.e., other than the iPod Shuffle). In one embodiment, the area where the miniature portable media player is installed includes a USB connector and optionally includes a 3.5 mm stereo plug. In one embodiment, the carrier is designed to slide open at one end and thus provide the travel required for a USB connector in the miniature portable media player to mate with a USB connector in the carrier.

In one embodiment, a cavity in the mechanical carrier comprises an industry standard 3.5 mm stereo plug and USB jack. When the mechanical carrier is in a closed position, the plug and jack are located in the position that they both would be engaged with the 3.5 mm jack and USB plug of the miniature portable media player if it were within the cavity. When the mechanical carrier is in an open position, the plug and jack are positioned so that the miniature portable media player can be inserted within the cavity.

In one embodiment, the carrier also provides sufficient travel from the closed position to the open position for a 3.5 mm plug to be extracted from the 3.5 mm jack on the miniature portable media player. The travel may be such that both the 3.5 mm stereo plug and the USB plug could be unconnected while the miniature portable media player is in a cavity within the carrier. This provides for easy insertion and removal of the miniature portable media player to/from the carrier. The housing of the adapter in this embodiment provides space and protection for any printed circuit board and electrical components required for voltage conversion (where necessary) and signal routing.

In one embodiment, a cavity in the mechanical carrier comprises a jack for a custom USB connector, such as the USB connector for the iPod Shuffle. When the mechanical carrier is in a closed position, the jack is located a position that it would be engaged with custom USB connector of the miniature portable media player if it were within the cavity. When the mechanical carrier is in an open position, the jack is positioned so that a miniature portable media player can be removed from within the cavity.

As is well known, the iPod Shuffle has externally accessible mechanically activated controls. In one embodiment of the inventive adapter, the housing is designed to make those mechanical controls accessible while the iPod Shuffle is operable engagement with the adaptor. In one embodiment, the housing provides a separate set of controls that perform at least some of the functions of the iPod Shuffle's controls. The separate controls can perform at least some of the functions of the iPod Shuffle's controls by mechanically engaging the iPod Shuffle's controls, by electronically controlling the iPod Shuffle through it's USB connector, or otherwise.

In one embodiment, a toaster-like slot forms a cavity in the mechanical carrier. A custom USB connector, such as the USB connector for the iPod Shuffle, is located at the end of the cavity such that it would be engaged with a custom USB connector of the miniature portable media player if it were within the cavity. The cavity permits at least a portion of the miniature portable media player to recess within, and may permit the entire body of an iPod Shuffle to recess within, leaving only a top surface and the Shuffle's stereo headphone jack exposed. The carrier may contain openings to permit access to the controls of the miniature portable media player when it is engaged with the custom USB connector. The carrier may further comprise a lifting mechanism that mechanically ejects a miniature portable media player engaged with the custom USB connector.

In addition to handling connectivity, the adapter may also handle any necessary or appropriate signal conversion, such as voltage or current conversion to provide the miniature portable media player with appropriate electrical signals for its operation and charging.

These embodiments provide a number of advantages. The mechanical housing allows the miniature portable media player, such as an iPod® Shuffle, to dock into a device designed for a standard-sized portable media player, such as an iPod mini, an iPod G3 or an iPod G4, using the mounting support mechanisms and connection methods of the standard portable media player. The inventive adapter can thereby provide the miniature portable media player with the ability to be charged, and to playback audio, over the 30-pin connector in much the same manner as a standard sized portable media player. Furthermore, the mechanical housing may provide additional protection to the miniature portable media player over an adapter cable. Moreover, no external wires or cables are required beyond those used with the standard-sized portable media player when in operation. The adapter according to this embodiment may be provided with a relatively flat profile, which is much more portable than a desktop docking station having similar functionality.

In addition, where the mechanical carrier is substantially in the size, shape and/or form factor of a specific portable media player, portability accessories (such as carrying cases) for such a portable media player may be used for portability of the miniature portable media player. In one embodiment, the mechanical carrier can emulate the connector form factor and/or electrical characteristics of any known portable media player (such as portable media players from Apple, or iRiver, or Creative), or any portable media player hereafter developed.

Because the inventive housing is larger than the miniature portable media player, it is possible (but not required) for the system to provide additional features that are normally not present on the miniature portable media player. For example, the additional space in the miniature portable media player can be used to house a headset for listening to audio output by the miniature portable media player via the mechanical carrier. In one embodiment, the headset connecting wire can be retracted within the housing when it is not in use using any known mechanism, or using the invention described in the commonly owned, co-pending U.S. patent application entitled Automatic Cable Retractor, (Ser. No. 143950, Publication No. 20060273211) filed Jun. 3, 2005, by inventors Erick Aaron Langberg and Eran Schul, the entire disclosure of which is incorporated herein by this reference. As another example of an additional feature, in one embodiment, the invention includes the processing, mechanical housing, display, firmware, and connections to allow an a miniature portable media player which does not have a display screen to replicate all or at least some of the functionality of a standard-sized portable media player which includes such display. In this respect, the adapter in this embodiment can transform such miniature portable media player into a device that looks and substantially operates like a standard-sized portable media player. Such a display system, with the appropriate software, can additionally be used to perform functions not performed by standard-sized portable media players, such as, displaying textual or graphical data stored on the miniature portable media player as PDFs, documents such as Microsoft Word files or Microsoft Excel spread sheets.

Figure 1A:
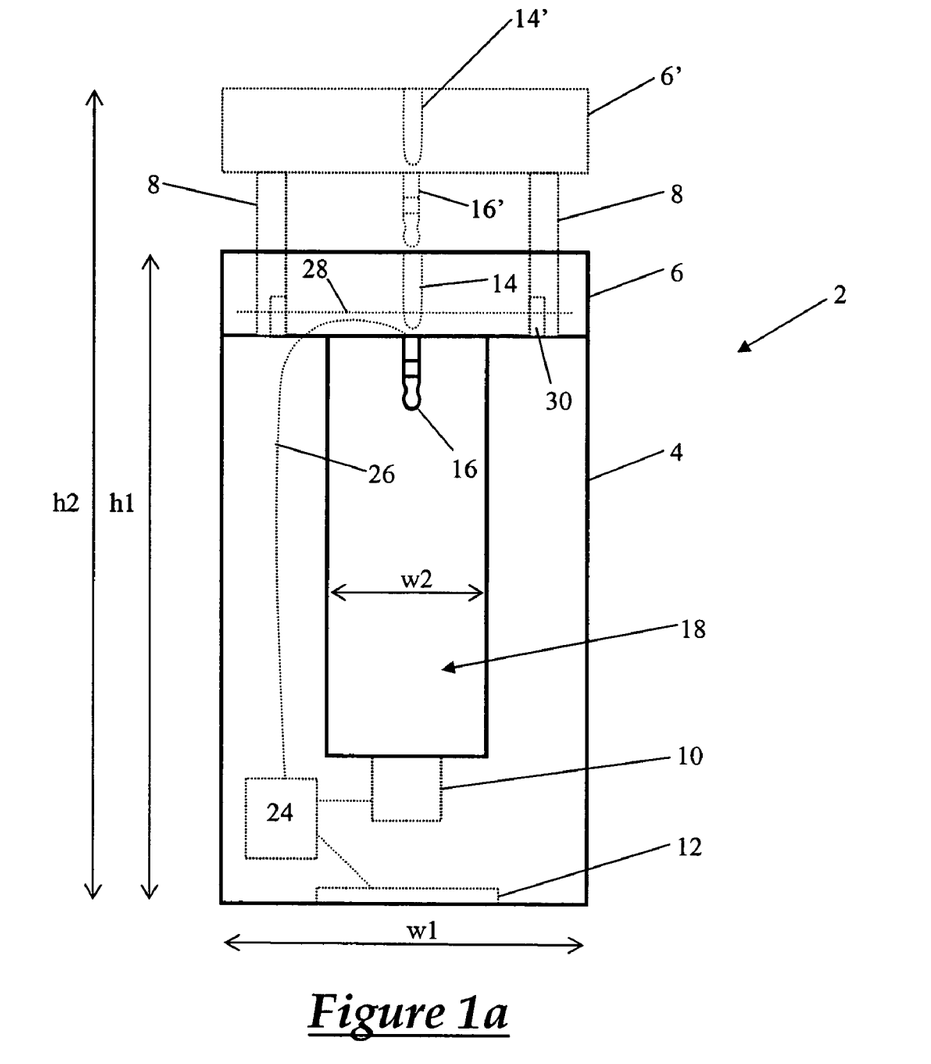
FIG. 1a shows a front view of the system according to one embodiment of the present invention.
Figure 1B:
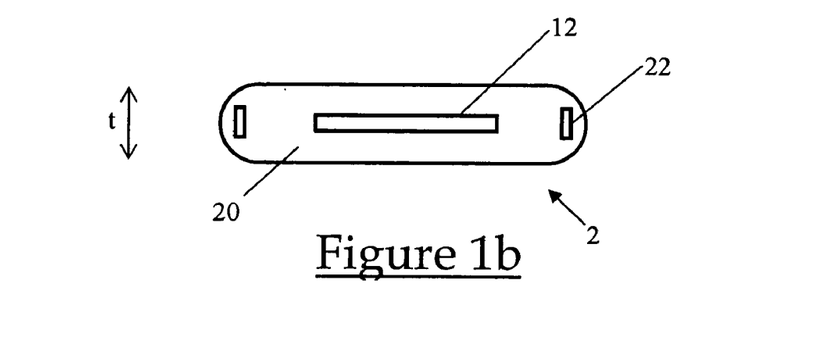
FIG. 1*b* shows a bottom view of the system shown in FIG. 1*a*.

Referring to FIGS. 1a and 1b, a system 2 according to one embodiment is configured to adapt a first electronic device, such as a miniature portable media player, to the dimensions and/or features of a second electronic device, such as a standard-sized portable media player. For the purposes of illustration and discussion herein, the first electronic device is an iPod Shuffle (or just Shuffle), and the second electronic device is an iPod (e.g., an iPod mini, G3 or G4), however, these are used for illustration only, and the invention is not limited to such devices. The system 2 comprises a first portion 6 (e.g. retaining portion) movably connected to a second portion 4 via rods 8. Either or both of the first and second portions 6, 4 may be slidable relative to the rods 8, so that the rods 8 maintain a connection between the portions 4, 6 but allow a translational sliding motion between them, as shown by the dotted lines illustrating a translated first portion 6' (having a jack 14' and a plug 16'). The system according to this embodiment further comprises a first jack 10 (such as USB jack) configured to mate with a corresponding plug (e.g., USB plug) of the Shuffle, a second jack 12 (e.g., a 30-pin connector) configured to mate with a corresponding plug (e.g., 30-pin connector) of an accessory or base unit of the iPod, a third jack 14, a plug 16 configured to engage with a corresponding jack of the Shuffle, an inner region 18 for holding or containing the Shuffle, and a converter 24 configured to effect any desired conversions and/or connections (e.g., voltage conversions, connections between first jack 10, second jack 12, third jack 14, plug 16, etc.). Further, the first portion 6 may be connected to the second portion 4 via an axle 30 that allows the first portion 6 to rotate or pivot relative to the second portion 4 on an axle 30 when the first and second portions 6, 4 are maximally separated. It is noted that "jack" and "plug" as used herein denotes a connector that may be either female or male.

The portions 4, 6, and/or rods 8 may include limits and/or locks configured so that the first portion 6 can separate no more than a predetermined distance from the second portion 4, and may be lockable in that open position or configuration, and/or lockable in a closed position or configuration. In one embodiment, the limits may take the form of one or more small deformable protrusions, or spring-loaded locks. Any such lock or locking mechanism known in the art is within the scope of the present invention. Thus, the first portion 6 may "snap" or "click" into place once fully in the open or closed configuration, as will be understood by one of ordinary skill in the art.

The second portion 4 may comprise a first jack 10, such as a USB port, and a second jack 12, such as an Apple 30-pin connector. The gender of any or all plugs/jacks may be reversed based on preference or design choice.

In one embodiment, the first portion 6 of the system 2 comprises a plug 16, such as a 3.5 mm (⅛") stereo audio plug, as well as a jack 14, such as a 3.5 mm (⅛") stereo audio jack. The plug 16 and the jack 14 may be electrically connected so that any audio signal passing to the plug 16 may be transmitted to the jack 14. Alternatively or in addition, one or both may be connected to a converter (e.g., processor or circuit) 24 via a conductor cable 26. In one embodiment, the first portion 6 of the system 2 comprises a plug 16, such as a 3.5 mm (⅛") stereo audio plug, but not a jack 14. This is particularly desirable where the system is to be principally used to adapt a miniature portable media player for use with an alternate connector, such as the iPod 30 pin connector. In one embodiment, the first portion 6 of the system 2 comprises a jack 14, such as a 3.5 mm (⅛") stereo audio jack, but not a plug 16. This configuration is desirable where, as in the case of an iPod Shuffle, the audio signal can be obtained through other means, such as a custom USB connector. In such latter configuration, the plug 16 may be a "dummy" plug, i.e., one that is not electrically connected to anything, and/or one that consists of an electrically nonconductive material, that serves a purpose only of aligning and/or more securely connecting the Shuffle within the region 18.

The second jack 12 is located in a position to correspond to the location of the Apple 30-pin connector on an iPod, namely, on a bottom side 20 of the second portion 4, which side may also comprise other connectors 22 (e.g. a mechanical interface) to allow the system 2 to be connected to accessories or bases that are configured to accommodate or connect to a second device which the system 2 attempts to emulate, illustratively, an iPod. In one embodiment, the second jack 12 includes a connector and/or locking mechanism (not shown), so that connecting the system 2 to a compatible accessory results in a secure connection.

The first, second and third (if present) jacks, 10, 12, 14 and the plug 16 (e.g. collectively the audio signal interconnect) are operatively connected to transfer appropriate signals there-between. In one embodiment some signals that are transferred among the first, second and/or third (if present) jacks 10, 12, 14, are connected via converter 24. Thus, in one embodiment, the first and second jacks 10, 12 are electrically connected via converter 24 so that power transferred from the second jack 12 is compatibly transferred to the first jack 10 for use by a miniature portable media player engaged with the first jack 10. In one embodiment, the first jack or the plug 10, 14, on the one hand, and the second jack 10, on the other hand, are electrically connected so that an analog audio signal from the first jack or the plug 16 is compatibly transferred to the second jack 12 for use by an accessory device. The electrical connection of the foregoing sentence may be accomplished via a converter 24, or without a converter, by direct connection (not shown). In such an embodiment, no converter 24 is required, and the audio signal transmitted to the jack 14 is connected via cable 26 directly to the appropriate audio output pins on the second jack 12.

The system 2 is configured to house or hold the first device in an inner region or cavity 18. The first device may be a miniature portable media player (such as the iPod® Shuffle) or any electronic device, such as, a digital media storage device, an electronic device containing a digital hard drive and/or other memory storage with corresponding interface modules, and the like. Specific examples include radio or television receivers, MP3 players, CD, DVD, or MiniDisk players, DV (digital video) players, satellite receivers, mobile phones, PDAs, and the like. In one embodiment, the inner region 18 of the system 2 is shaped and configured to receive or accommodate the particular device for which it is designed to adapt. In one embodiment, the region 18 of the system 2 is adapted to support and retain the particular device for which it is designed to adapt, but is not designed to receive it completely within the inner region 18.

In one embodiment, the system 2 has an outer width w1 that corresponds to a width of the second device. The second device may be a standard-sized portable media player (e.g. an iPod® or iPod® Mini) or any electronic device, such as a digital media storage device, electronic devices containing digital hard drives and/or other memory storage with corresponding interface modules, and the like. If, for example, the second device is an iPod® Mini, the system 2 may be designed so that the outer width w1 is approximately 51 mm. As another example, if the second device is a standard-sized iPod®, the system may be designed so that the outer width w1 is approximately 60 mm. In one embodiment, the system 2 has an inner width w2 of inner region 18 that corresponds to a width of the first device. If, for example, the first device is an iPod® Shuffle, the system 2 may be designed so that the inner width w2 is approximately 23 mm. The system 2 may have a closed height h1 that corresponds to a height of the second device, and an open height h2 that is sufficient such that the first device may be removed from the system 2 when the system 2 is in the open configuration. In one embodiment, where the system 2 includes a plug 16, the inner region 18 when in the open configuration is sufficiently long to allow the first device to be placed within the inner region 18, in spite of a protruding plug 16 and any USB or other plug protruding from the first device or for connection with the other end of the first device. If the system 2 does not include a plug 16, then the open height h2 of the system 2 may be reduced. In one embodiment, the system 2 has a thickness t that corresponds to a thickness of the second device.

The inner region 18 may essentially comprise a through-hole—i.e., the second portion 4 may be substantially U-shaped, or inner region 18 may comprise a backing/support 224 (shown in FIG. 3) such that second portion 4 may comprise a parallelepiped or generally rectangular box, which may have rounded or smoothed edges, with an indentation or recession corresponding to inner region 18, which may be shaped to accommodate the first device. In one embodiment, this accommodation is such that, when housed, the front face of the first device is substantially flush with the front face of the system 2). By exposing the front face of the first device even when the first device is housed in the system 2, any controls/displays of the first device that are located on its face remain accessible to a user even when housed in the system 2. In one embodiment, the first device is accommodated such that its front face is recessed behind the front face of the system 2. In such embodiment, the system 2 may have a cover that partially, or completely, covers the front face of the fist device. As described above, such a cover may have a set of controls that are able to either mechanically or electrically operate the first device.

The converter 24 is configured to make the appropriate connections between the various jacks 10, 12, 14 and/or the plug 16, so that information and/or power may be transferred properly to and from the first device and the accessory to which the mated system 2 is connected. For example, the iPod Shuffle may require an operating voltage and current specified for a USB connector, whereas an iPod may be provided with a different voltage and/or current via a charging base according to the specification for the 30-pin connector. The converter 24 may therefore be configured in a manner understood by one of ordinary skill in the art to appropriately adjust or convert the voltage received via second the jack 12 (e.g., Apple 30-pin connector) and delivered to the first device via the first jack 10 (e.g., USB connector).

Figure 2:
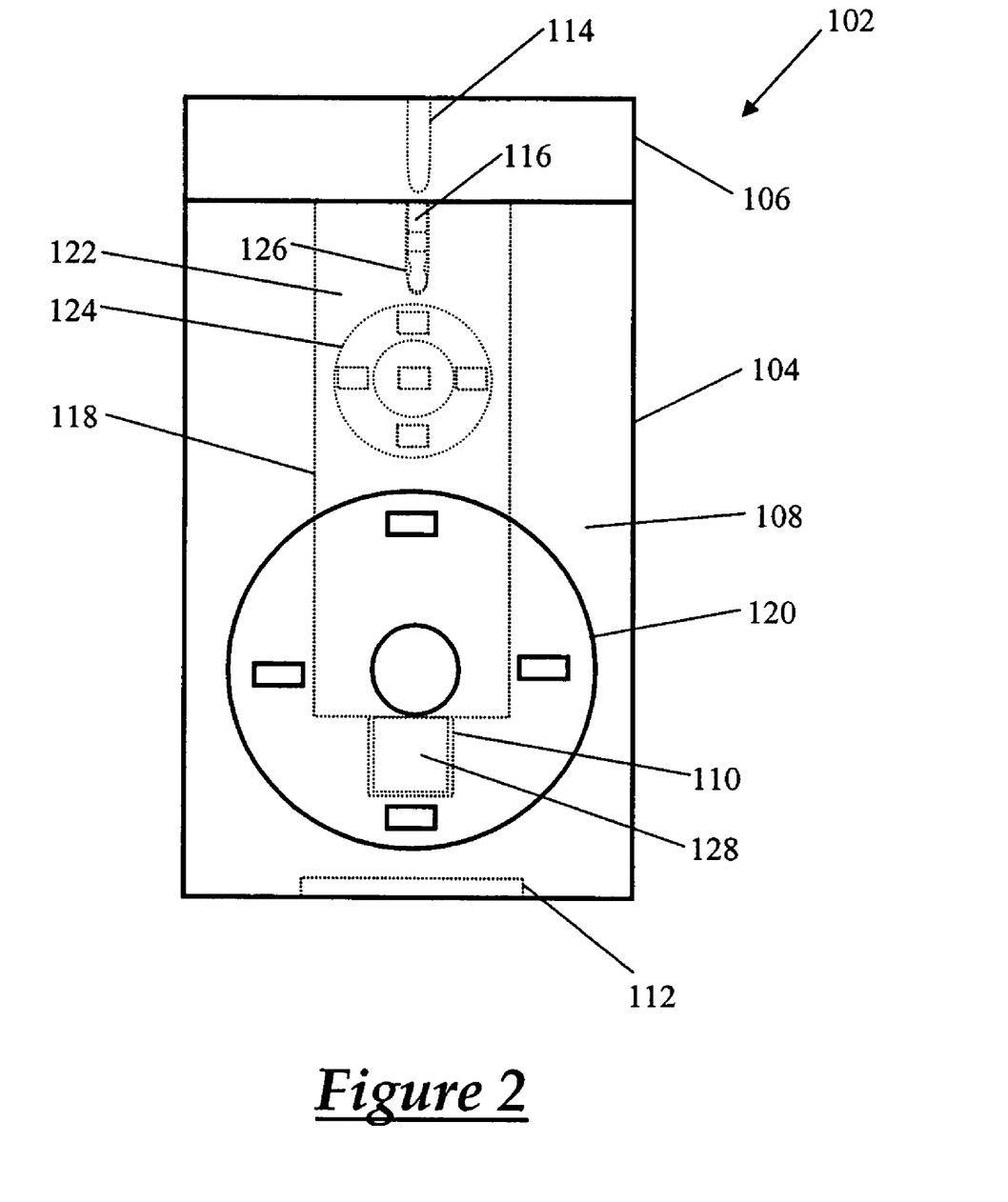
FIG. 2 shows a front view of the system according to one embodiment of the present invention.

Referring now to FIG. 2, a system 102 comprises a first portion 106 movably connected to a second portion 104, and is shown housing a first device 122 inside inner region or cavity 118. The second portion 104 comprises a first jack 110 (e.g., a USB port) mated with a corresponding plug 128 (e.g., USB plug) of the first device 122, a second jack 112 configured to mate with an accessory or base unit of the second device, a plug 116 mated with a corresponding jack 126 of the first device 122, and a third jack 114 configured to output an audio signal based on an input received from the first device 122 via the plug 116, or otherwise. Unlike the embodiment shown in FIG. 1a, the system 2 comprises a face 108 that covers a front face of the first device 122, so that the cavity 118 fully enshrouds the first device 122. The face 108 includes an input control panel 120 (e.g. a control interface) that may correspond to the input control panel 306 of the second device (FIG. 4a), and may include input buttons such as play, stop, pause, skip, repeat, and so forth. The system 102 is configured so that information input via the input control panel 120 is transferred to the first device 122, such as via the input control panel 124 of the first device 122. Thus, in the embodiment shown in FIG. 2, the system 102 may appear very similar to the second device (e.g., FIG. 4a), and may be controllable in very similar ways. Further, the system 102 may include an output screen, or mock output screen, corresponding to the output screen 304 shown in FIG. 4a.

The cavity 118 may be configured such that no face of the first device is exposed when housed inside system 102. In this a case, the face 108 of the system 102 may comprise the input control panel 120, buttons, switches, displays, or other I/O mechanisms that may correspond to the second device, that interact with the first device (e.g., input control panel 124) through the face 108 of the system 102. Thus, when the first device is housed inside the system 102, the system 102 attempts to emulate, appears, and/or interacts with a user or other compatible devices in a manner similar or identical to that of the second device, except that the features, memory, processing power, etc., may be limited by the first device. For example, the second device may comprise an Apple iPod (or Apple iPod Mini), which is physically larger and contains more digital memory than the iPod Shuffle.

Thus, when the first device is housed in the system 102, the mated system may be mounted and/or connected to any device or accessory that is configured to connect to the second device. In one embodiment (e.g., FIGS. 1a and 3), the first device is directly accessible to the user, and in another embodiment (e.g., FIG. 2), the first device is only accessible to the user via buttons, etc., located on a front face of the system, where the system appears similar to, is shaped similar to, and/or emulates the second device.

A non-limiting illustrative example of operation is as follows. The user opens the system 2, e.g., by unlocking and/or pulling, thus separating the first portion 6 and the second portion 4 sufficiently to insert an iPod Shuffle. Then, the user inserts the Shuffle into the cavity 18. The user then compresses the first portion 6 and the second portion 4 together, causing the system 2 to close. The closing causes the USB plug of the Shuffle into the first jack 10 (e.g, a USB port), and a male 3.5 mm (⅛") stereo plug 16 into a corresponding female 3.5 mm (⅛") stereo jack of the iPod Shuffle. Once closed, the iPod Shuffle has effectively been adapted to take on the configuration of an iPod, and all required electrical connections are made, so that the mated system may now be connected to an iPod accessory or computer for charging, playing audio, and/or downloading of audio files. One example of such an accessory is the inMotion™ iM3™ portable speaker system from Altec Lansing Technologies, Inc., of Milford Pa. In one embodiment, audio signals provided by the adapted iPod Shuffle may be transmitted to the speaker system via the 3.5 mm (⅛") stereo plug 16 connected to the 30-pin connector (second port) 12. The stereo plug 16 may be connected to the 30-pin connector 12 via the converter 24 and cable 26. In one embodiment, audio signals provided by the adapted iPod Shuffle may be transmitted to the speaker system via the custom Apple USB connector. In either event, the user may then control the mated system directly (see FIGS. 1a and 3) by pressing buttons of the iPod Shuffle, indirectly (FIG. 2) by pressing buttons of a front face of the system 2 that either causes mechanical engagement with the Shuffle's buttons, or transmits I/O information to and from the enclosed iPod Shuffle, or, from the accessory or a remote control, as is well known in the art.

It should be noted that in order to make the adaptor compatible with some operations of some iPods, an additional port is required (not shown) for connection. This connector appears on the top of an iPod, and its functions are well known and documented. Providing this port, in addition to the other connectors is within the scope of this invention and will enhance the number and type of accessories that can be used with a Shuffle mated to the system 2, 102, 202.

Figure 3:
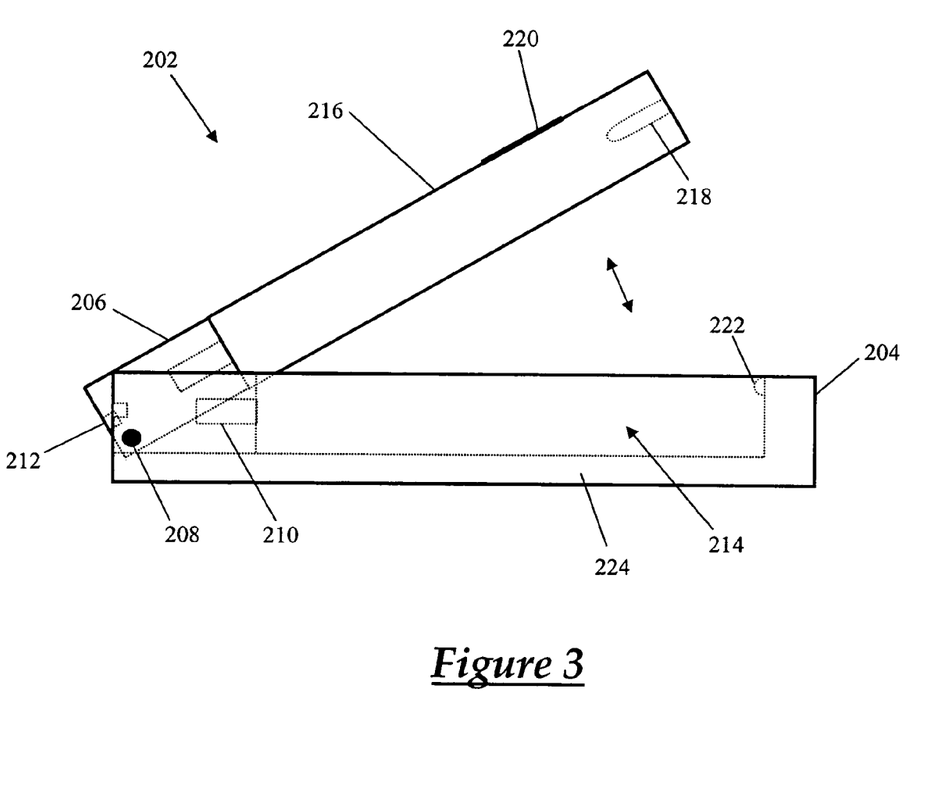
FIG. 3 shows a side view of the system according to one embodiment of the present invention.

Referring now to FIG. 3, a system 202 according to another embodiment comprises a first portion 204 and a second portion 206 rotatably connected to the first portion 204 via an axle 208. It is noted that the first portion and the second portion as described in this disclosure may be separate areas of a single unit, may be separate units, or may be two or more units operably connected to one another, either fixedly, hingedly or otherwise. The second portion 206 comprises a first jack 210 (e.g., a USB port) and a second jack 212 (e.g., an Apple 30-pin connector). The first portion 204 comprises an inner region 214 shaped to accommodate a first device 216 such as a Shuffle, a lock 222 ( e.g. a locking mechanism, such as one or more small compressible or deformable protrusions or spring-loaded locks) that is configured to hold the first device in the inner region 214 when the system 202 is in a closed configuration, a backing/support 224 against which the first device 216 may rest in the closed configuration, and optionally a third jack (not shown) that outputs an audio signal from the system 202. The first device 216 includes an input/output panel 220 that may allow a user to input or output information to or from the first device 216, and a jack 218 configured for outputting an audio signal from the first device 216. In operation, the second portion 206 may be rotated or swiveled upward (in the direction shown by the arrow) about an axis parallel to axle 208 so that a user may insert the USB plug of the first device 216 into the first female jack (USB port) 210, and then rotate the first device 216 into the inner region 214 until it is parallel and/or substantially flush with a face or surface of the system 202. Using the lock 222 on the system 202, the first device 216 may "snap" or "click" into place once properly aligned with the inner region 214, as will be readily understood by one of ordinary skill in the art. The mated system may now be used in a manner similar to the second device (which the system 202 attempts to emulate) and/or connected to accessories or a base unit designed for the second device.

The iPod Shuffle, in its present configuration, comprises a switch for changing modes, between off, or two modes of on, namely ordered play or shuffled play. The switch is positioned on the rear face of the device opposite its other controls. Accordingly, in one embodiment of the invention, the system 2, 102, 202 would provide a means by which the Shuffle can be selected between its modes. In one embodiment, in its closed position, the system 2, 102, 202 has an opening sufficient for a user to manually access the switch of the Shuffle. In one embodiment, in its closed position, the system 2, 102, 202 has a mechanical or electromechanical mechanism permitting a user to change the position of the switch of the Shuffle. In one embodiment, the Shuffle switch remains physically in one of the states (e.g., shuffle mode), and commands are sent to the Shuffle over its USB connector to cause the unit to change modes, i.e., to "sleep" to conserve power, or to "wake" to play music.

In the illustrations presented herein in FIGS. 1, 2 and 3, the miniature portable media player is depicted as being housed centrally in the system 2, 102, 202. It is within the scope and spirit of this invention to accommodate the miniature portable media player in any location and orientation that will permit the system 2, 102, 202 to be accepted in accessory devices designed for the portable media player being emulated.

Figure 5:
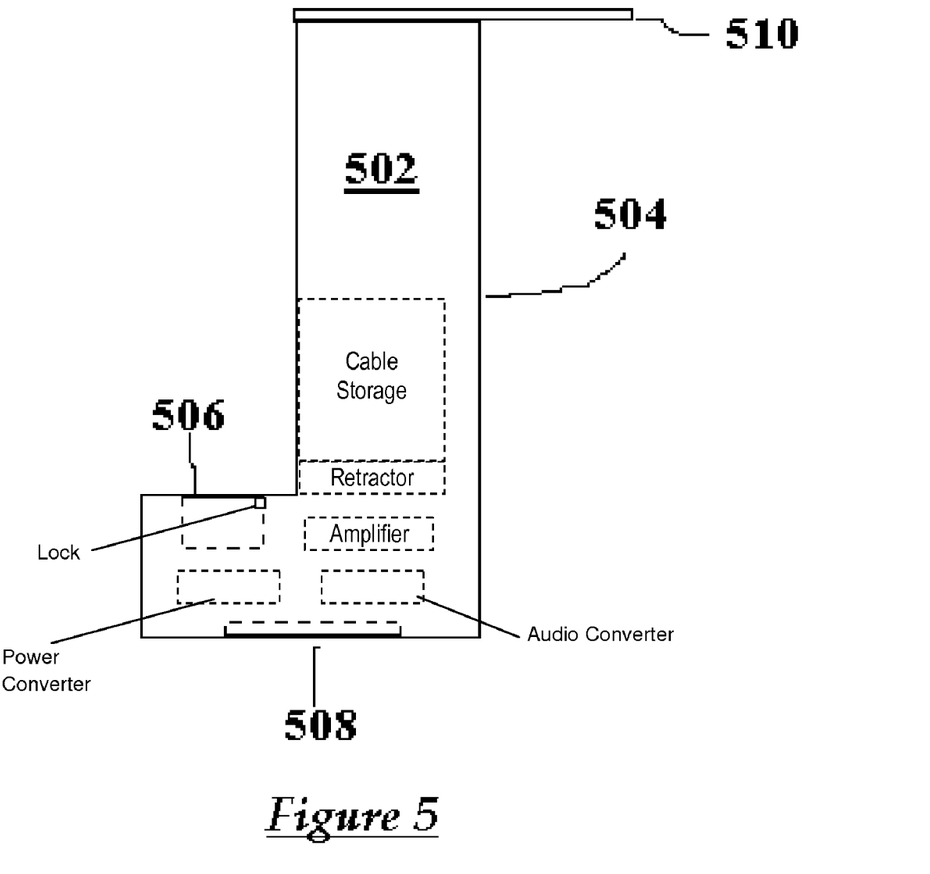
FIG. 5 shows a front view of the system according to an embodiment of the present invention.

Turning now to FIG. 5, a system 502 according to another embodiment comprises a first portion 504 and a second portion 510 movably connected to the first portion 504. The system 502 comprises custom USB jack 506 and 30-pin connector 508. In the illustrated "open" position, a miniature portable media player such as a Shuffle can be connected to the system 502 by inserting the custom USB connector on the Shuffle into jack 506. Once the Shuffle is so connected, the unit may be moved to a "closed" position by moving the second portion 510 so that it inhibits removal of the Shuffle from the jack 506. In one embodiment, the second portion 510 is slidably connected to the first portion 504; in one embodiment, the second portion 510 is rotatably connected to the first portion 504. In one embodiment, the jack 506 provides sufficient connection, and the second portion 510 is not necessary. In one embodiment, second portion 510 comprises a strap securing the Shuffle to the first portion 504. A converter (not show) is used to appropriately modify the signals transmitted between back 506 and the connector 508, and thus between the Shuffle and any accessory device.

Because the system 502 accommodates a Shuffle to one side, instead of being generally centered, storage for a headset or connecting cable can be provided in a larger undivided compartment. In one embodiment, a headset is provided in the first portion and an automatic cable retractor such as a rotatable cable retractor, or the inventive cable retractor described in co-pending U.S. patent application entitled Automatic Cable Retractor, filed Jun. 3, 2005, by inventors Erick Aaron Langberg and Eran Schul, is located within the first portion 504.

Figure 6:
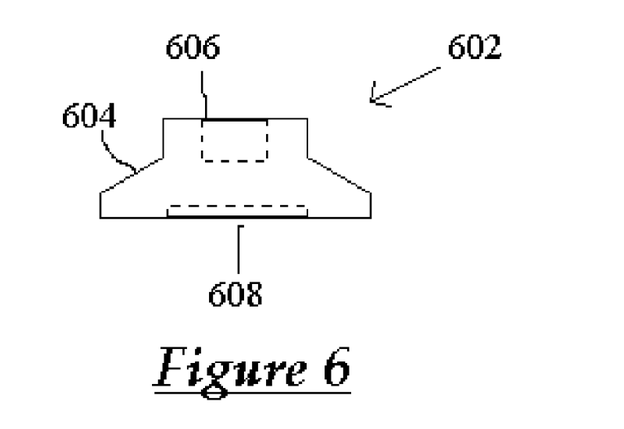
FIG. 6 shows a front view of the system according to an embodiment of the present invention.

Turning now to FIG. 6, a system 602 according to another embodiment comprises a housing 604 having a custom USB jack 606 and 30-pin connector 608. A miniature portable media player such as a Shuffle can be connected to the system 602 by inserting the custom USB connector on the Shuffle into jack 606. In one embodiment, the jack 606 provides sufficient connection to retain the Shuffle on the housing 604. In one embodiment, a lock (not show, is engaged to securely connect the Shuffle to the housing 604. A converter (not shown) is used to appropriately modify the signals transmitted between the jack 606 and the connector 608, and thus transmitted between the Shuffle and any accessory device. The connector 608 of the system 602 is configured to fit, mechanically, into an accessory device that accommodates an iPod having the Apple 30-Pin connector.

Figure 7:
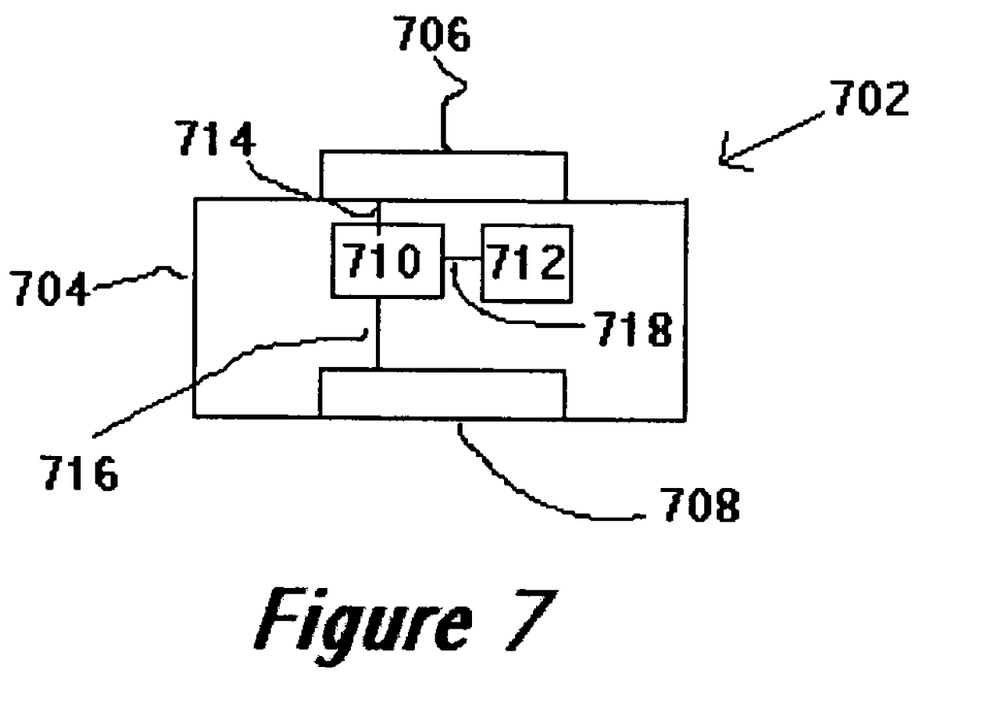
FIG. 7 shows a schematic view of the system according to an embodiment of the present invention.

Turning now to FIG. 7, a system 702 according to one embodiment comprises a housing 704 having a 30-pin connector 708 and an opposing gender 30-pin connector 706. The cable 714 carries an analog audio signal received on the opposing gender 30-pin connector 706 to an attenuator/amplifier 710. The cable 716 carries an analog audio signal from the attenuator 710 to the appropriate pins of 30-pin connector 708. A control 712 affects the attenuation of attenuator 710 via interface 718. Illustratively, an iPod operatively connected to the opposing gender 30-pin connector 706, will have its audio signal sent to 30-pin connector 708 via attenuator 710. The remaining (non-audio) pins of the opposing gender 30-pin connector 706 may be operatively wired (not shown) to the corresponding pins on the 30-pin connector 708. In one embodiment, the control 712 can be remotely operated by a remote control (not shown).

In one embodiment, the housing 704 contains a processor (not shown) operatively interfaced with the opposing gender 30-pin jack 706. The processor can receive commands (e.g., skip, play, fast forward, reverse, volume up, volume down or pause) from control 712 (locally or via remote control) that can be transmitted to opposing gender 30-pin jack 706 in a form that can be interpreted by an iPod connected thereto. Thus, in addition to, or alternatively to controlling the volume, the inventive system 702 can be used to issue commands to the iPod.

Variations of the disclosed embodiments are within the scope of the present invention. For example, any other means known in the art for connecting the first and second portions 6, 4 to allow the first device to be housed in the system 2 with desired electrical connections made are within the scope of the present invention. Further, any of the disclosed plugs/ports may be replaced with others known in the art. For example, either plug 16 and/or jack 14 may be replaced with a standard ¼" stereo plug/jack, one or more RCA plugs/ports, optical plugs/jacks, and so forth. Further, jacks 10, 12 may comprise one or more of USB 1.1, 2.0 plugs/jacks, FireWire plugs/jacks, optical plugs/jacks, and so forth.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An adapting device for adapting an iPod® Shuffle to emulate selected mechanical and electrical characteristics of an iPod having a multi-pin connector, the adapting device comprising:

a housing adapted to engage the iPod Shuffle comprising an Universal Serial Bus (USB) compatible connector and a multi-pin connector;

a power converter within the housing for converting a first charging signal received over the multi-pin connector into a second charging signal for transmission over the USB connector, the second charging signal being compatible with the iPod Shuffle; and     a mechanical interface translating a surface of the housing configured to interconnect the multi-pin connector with an accessory device that accommodates the iPod having a multi-pin connector.

2. The adapting device according to claim 1, further comprising an audio signal interconnect within the housing adapted to operatively connect an analog audio signal output from the iPod Shuffle with the audio output of the multi-pin connector.

3. The adapting device according to claim 2, wherein an analog audio signal output from the iPod Shuffle is output at an audio jack of the iPod Shuffle, the audio signal interconnect of the adapting device comprises an audio plug adapted to interface with the audio output jack of the iPod Shuffle.

4. The adapting device according to claim 3, the audio signal interconnect of the adapting device further comprising an audio signal converter operatively connected to the audio plug and the multi-pin connector, the audio signal converter converting the audio signal received on the audio plug into an audio signal specified for the multi-pin connector.

5. The adapting device according to claim 2, wherein an analog audio signal output from the iPod Shuffle is output at a custom USB connector, and wherein the audio signal interconnect comprises the USB compatible connector adapted to operatively connect the custom USB connector of the iPod Shuffle.

6. The adapting device according to claim 1, further comprising:

a retaining portion movably attached to the housing, and adapted to have a retaining and a non-retaining position;

wherein, the retaining portion is adapted to inhibit removal of the iPod Shuffle engaged with the USB connector of the adapting device when it is in the retaining position; and     wherein the retaining portion is adapted to permit removal of the iPod Shuffle from engagement with the USB connector of the adapting device when it is in the non-retaining position.

7. The adapting device according to claim 6, wherein the retaining portion is a locking mechanism proximate the USB connector.

8. The adapting device according to claim 6, wherein the retaining portion is movably connected to the housing, and in the retaining position, the retaining portion engages the iPod Shuffle distal from its engagement with the USB connector.

9. The adapting device according to claim 8, wherein the retaining portion is slidably connected to the housing.

10. The adapting device according to claim 8, wherein the retaining portion is rotatably connected to the housing.

11. The adapting device according to claim 1, wherein the mechanical interface is located on a first surface of the housing, and the first surface of the housing has the approximate dimensions of the surface containing a multi-pin connector of a portable media player selected from the set of: iPod mini; iPod G3 and iPod G4.

12. The adapting device according to claim 1, wherein the housing has the approximate overall dimensions of a portable media player selected from the set of: iPod mini; iPod G3 and iPod G4.

13. The adapting device according to claim 1, further comprising a cavity within the housing for receiving the iPod Shuffle.

14. The adapting device according to claim 13, wherein the cavity is adapted to receive the iPod Shuffle with at least one face substantially flush with a one face of the housing.

15. The adapting device according to claim 13, wherein the housing has an outer perimeter, and the cavity is adapted to receive the iPod Shuffle so that no face is outside the outer perimeter of the housing.

16. The adapting device according to claim 1, further comprising:
   a first control mounted on the housing and being externally accessible, the first control being selected from the group consisting of: volume up, volume down, play, pause, skip, fast forward, reverse; and
   a control interface adapted to communicate the activation of the first control to the iPod Shuffle engaged with the USB compatible connector.

17. The adapting device according to claim 16, wherein the iPod Shuffle has a second control corresponding to the first control, and wherein the control interface communicates the activation of the first control by mechanically engaging the second control.

18. The adapting device according to claim 16, wherein the iPod Shuffle has a second control corresponding to the first control, and wherein when the iPod Shuffle is engaged with the USB connector, the control interface communicates the activation of the first control by sending a command corresponding to the first control to the iPod Shuffle via the USB connector.

19. The adapting device according to claim 1, further comprising:
   a headset and cable adapted to interface an analog audio signal output from the iPod Shuffle; and
   a cable storage area within the housing, the cable storage area being of sufficient size to accommodate at least the majority of the cable.

20. The adapting device according to claim 16, further comprising a cable retractor within the housing adapted to retract at least the majority of the cable into the cable storage area.

21. An adapting device for adapting an iPod® Shuffle having an audio signal output to emulate selected mechanical and electrical characteristics of an iPod having a multi-pin connector, the adapting device comprising:
   a housing adapted to engage the iPod Shuffle comprising an Universal Serial Bus (USB) compatible connector and a multi-pin connector;
   an audio signal interconnect within the housing adapted to operatively connect an analog audio signal output from the iPod Shuffle with the audio output of the multi-pin connector; and
   a mechanical interface translating a surface of the housing configured to interconnect the multi-pin connector with an accessory device that accommodates the iPod having the multi-pin connector.

22. The adapting device according to claim 21, wherein an analog audio signal output from the iPod Shuffle is output at an audio jack of the iPod Shuffle, the audio signal interconnect of the adapting device comprising an audio plug adapted to interface with the audio output jack of the iPod Shuffle.

23. The adapting device according to claim 22, the audio signal interconnect of the adapting device further comprising an audio signal converter operatively connected to the audio plug and the multi-pin connector, the audio signal converter converting the audio signal received on the audio plug into an audio signal specified for the multi-pin connector.

24. The adapting device according to claim 21, wherein an analog audio signal output from the iPod Shuffle is output at a custom USB connector, and wherein the audio signal interconnect comprises the USB compatible connector adapted to operatively connect the custom USB connector of the iPod Shuffle.

25. The adapting device according to claim 21, the audio signal interconnect further comprising an attenuator for reducing a level of an analog audio signal output from the iPod Shuffle, the attenuator operatively connected between an analog audio signal output from the iPod Shuffle and the audio output of the multi-pin connector.

26. The adapting device according to claim 25, the audio signal interconnect further comprising an audio level amplifier for increasing a level of an audio signal output from the iPod Shuffle, the audio level amplifier operatively connected between an analog audio signal output from the iPod Shuffle and the audio output of the multi-pin connector.

27. The adapting device according to claim 21, wherein the mechanical interface is located on a first surface of the housing, and the first surface of the housing has the approximate dimensions of the surface containing a multi-pin connector of a portable media player selected from the set of: iPod mini; iPod G3 and iPod G4.

28. The adapting device according to claim 21, wherein the housing has the approximate overall dimensions of a portable media player selected from the set of: iPod mini; iPod G3 and iPod G4.

29. The adapting device according to claim 21, further comprising:
   a first control mounted on the housing and being externally accessible, the first control being selected from the group consisting of: volume up, volume down, play, pause, skip, fast forward, reverse; and
   a control interface adapted to communicate the activation of the first control to the iPod Shuffle engaged with the USB compatible connector.

30. The adapting device according to claim 29, wherein the iPod Shuffle has a second control corresponding to the first control, and wherein the control interface communicates the activation of the first control by mechanically engaging the second control.

31. The adapting device according to claim 29, wherein the iPod Shuffle has a second control corresponding to the first control, and wherein when the iPod Shuffle is engaged with the USB connector, the control interface communicates the activation of the first control by sending a command corresponding to the first control to the iPod Shuffle via the USB connector.

32. The adapting device according to claim 21, further comprising:
   a headset and cable adapted to interface an analog audio signal output from the iPod Shuffle; and
   a cable storage area within the housing, the cable storage area being of sufficient size to accommodate at least the majority of the cable.

33. The adapting device according to claim 32, further comprising a cable retractor within the housing adapted to retract at least the majority of the cable into the cable storage area.

34. An adapting device for adapting an iPod® Shuffle to emulate selected mechanical and electrical characteristics of an iPod having a multi-pin connector, the adapting device comprising:

a housing adapted to engage the iPod Shuffle comprising an Universal Serial Bus (USB) compatible connector and a multi-pin connector;

a signal converter operatively connected to the USB compatible connector and the multi-pin connector for converting a first signal representing at least one command, the first signal being received over the multi-pin connector, into a second signal representing the at least one command to be transmitted over the USB compatible connector; and a mechanical interface translating a surface of the housing configured to interconnect the multi-pin connector with an accessory device that accommodates the iPod having the multi-pin connector.

35. The adapting device according to claim 34, further comprising an audio signal interconnect within the housing adapted to operatively connect an analog audio signal output from the iPod Shuffle with the audio output of the multi-pin connector.

36. The adapting device according to claim 34, a power converter within the housing for converting a first charging signal received over the multi-pin connector into a second charging signal for transmission over the USB connector, the second charging signal being compatible with the iPod Shuffle.

37. The adapting device according to claim 36, further comprising an audio signal interconnect adapted to operatively connect an analog audio signal output from the iPod Shuffle with the audio output of the multi-pin connector.

* * * * *